Patented Aug. 11, 1925.

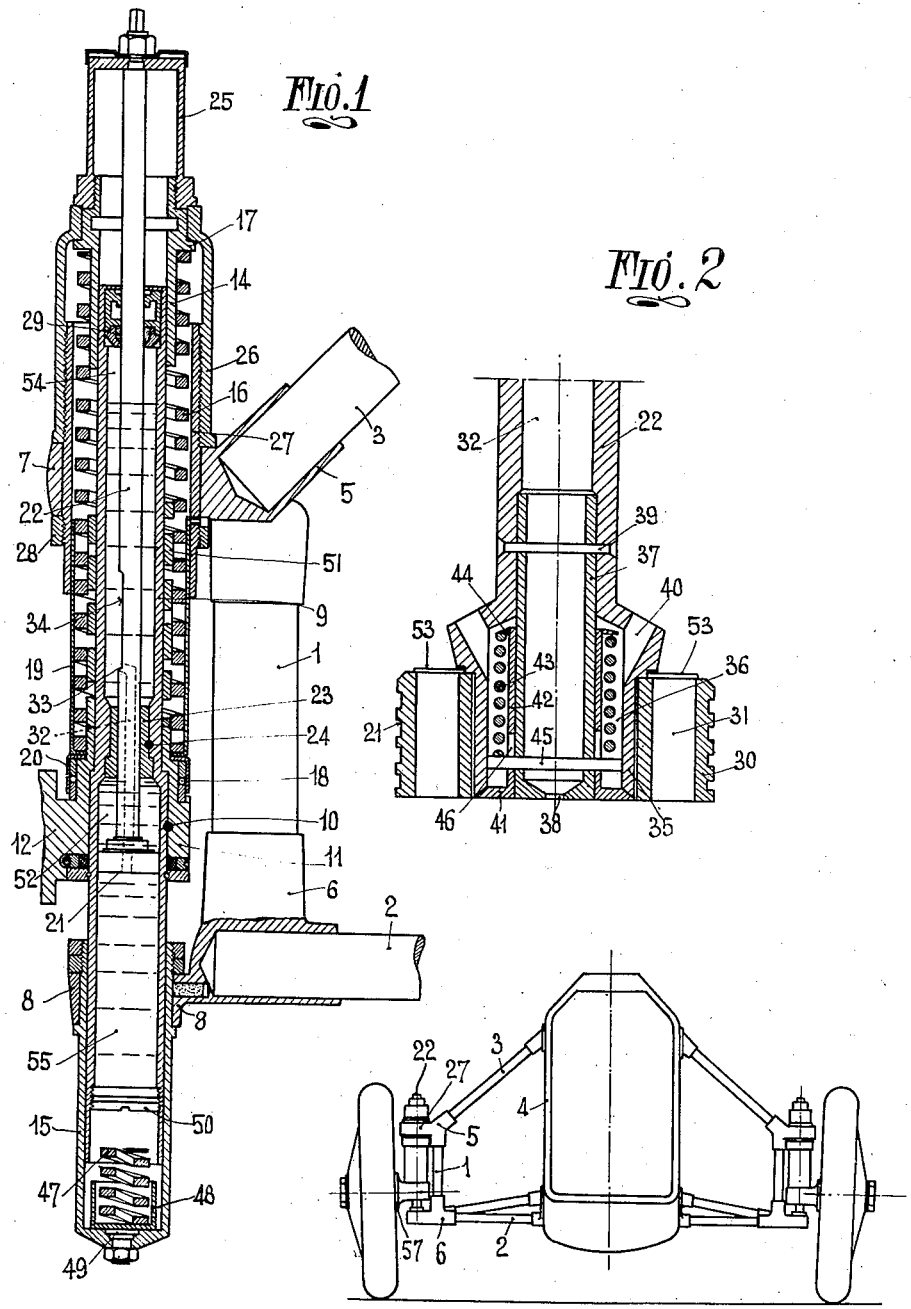

1,549,367

UNITED STATES PATENT OFFICE.

VINCENZO LANCIA, OF TURIN, ITALY.

SHOCK ABSORBER.

Application filed December 11, 1924. Serial No. 755,310.

*To all whom it may concern:*

Be it known that I, VINCENZO LANCIA, subject of the King of Italy, residing at Turin, Italy, have invented certain new and useful Improvements in Shock Absorbers, of which the following is a specification.

The present invention relates to shock absorbers with liquid damping medium and particularly to absorbers intended to damp the respective movements of two parts, as used in the suspension of motor cars and the like.

On the annexed drawing is shown by way of example an embodiment of the present invention and:

Figure 1 is a central section of an absorber adapted for the resilient mounting of a wheel on a motor car;

Figure 2 is a detail of the same in central section and to an enlarged scale, and Figure 3 is a general front view of a motor car in which the present invention is embodied in the suspension for the front wheels.

As shown on the drawing, at the front end of the car are provided structures comprising bars 1, 2, 3 fastened to the car frame 4 and interconnected by coupling members 5 and 6 which provide bearings 7 and 8 respectively.

The absorber comprises a hollow member 9 on which a collar 11 carrying a pivot 12 for the wheel hub 57 is made solid by means of a pin 10, and said member 9 is mounted to rotate and reciprocate in sleeves 14 and 15 supported by the bearings 7 and 8 respectively.

A spring 16 is located between a shoulder 17 of the sleeve 14 and a ball bearing 18 resting on collar 11; protecting sleeves 19 and 20 are located on said spring and ball bearing, said sleeve 19 being free to telescope within the part 27 encircling it.

An auxiliary spring 51 is located within the spring 16 and said spring 51 is shorter than that 16 so as to be compressed between collar 21 which is solid with said hollow member 9 and the bottom edge of the sleeve 14 after said main spring 16 has been partially compressed and shortened.

A piston 21 is fastened on a hollow stem 22 which passes through a packing sleeve 23 removably fastened in the member 9 by means of a pin 24, and is secured at its top to a top cover 25 which in turn is fastened to sleeve 14 and to a cover 26 secured on a sleeve 27 engaged in bearing 7 by means of a nut 28.

The piston 21 (see Figure 2) comprises a ring 30 having ports 31 parallel to stem 22 and having at their top outlet flap valves 53. Said ring is fastened on a hollow head 35 of the stem 22, said flap valves 53 being conveniently engaged for their mounting in position between the said ring 30 and the edge of head 35, and this stem has a central passage 32 leading to an outlet 33 opening in a recessed portion 34 of said stem. The head 35 of the stem 22 provides an enlarged chamber 36 and a sleeve 37 having a bottom restricted and calibrated port 38 is fastened on said stem by a pin 39 and extends centrally in said chamber. Ports 40 open from said chamber in the space above the said head, and an annular valve 41 is located at the bottom of said chamber 36 to close the annular space between said sleeve 37 and the annular edge of the head 35, said valve being carried by a tubular member 42 adapted to slide on sleeve 37, and being held on its seat by a spring 43 acting on a flange 44 of said tubular extension 42 and on a pin 45 fastened to the sleeve 37 while said tubular member has slots 46 permitting its motion with respect to said pin and sleeve.

At the bottom of the sleeve 15 is located a coil spring 47 enclosed in a shell 48 fastened by a bolt 49 on said bottom of the sleeve 15, and a pad 50, say of fibre, is arranged on the lower face of the bottom end of member 9 said pad being intended to contact with said spring on the said member 9 coming down with respect to sleeve 15.

A liquid as oil is located in the end chambers 54—55 and in the intermediate chamber 52 provided in said hollow member 9 by its top packing gland 29, intermediate packing gland 23, piston 21 and bottom plug 56 of the same.

When the wheel and member 9 carrying it are moved upward with respect to car frame to which are solid stem 22 and piston 21, oil flows from chamber 55 into the chamber 52 through ports 31, the flap valves 53 opening at this time, while the valve 41 is closed, and also into chamber 54 through the calibrated port 38, passage 32 and outlet 33. The motion of the parts is thus damped and the spring 16 is compressed; after said spring has been compressed and shortened to a certain extent the spring 51 is made operative to damp the respective motion of said parts.

During the recoil stroke produced by the recoil action of the springs 16 and 51 the chamber 52 is decreasing in volume and as the flap valves 53 close at this time, the liquid contained in said chamber 52 must flow through ports 40 and opens valve 41 thus flowing into chamber 55 while oil from chamber 54 flows through ports 33, passage 32 and port 38, and near the end of its downward stroke the member 9 engages by its bottom pad 50 said spring 47 which cushions its motion.

In view of the respective size of ports open to oil flow during the motion of member 9 in upward and downward directions the damping action of the absorber is more efficient when the member 9 and wheel carried thereby move down than when they move up, as required in damping shocks for vehicle suspension.

Attention is called to my pending patent applications Ser. No. 605103 and 606723 in respect of features illustrated on the drawing but not claimed per se in this application.

What I claim as my invention and desire to secure by United States Letters Patent is:—

1. A shock absorber comprising supports, a hollow member mounted to move in said supports and having a bored intermediate partition, said supports and member being attachable to parts whose respective motion is to be damped, a stem fastened to one of said supports and snugly slidable through said bored partition and extending into said hollow member, a piston on said stem snugly sliding in the hollow of said member, said member and piston providing two end chambers and an intermediate chamber to be filled with liquid, said piston and stem providing a passage from one to other of said end chambers and said piston having ports for producing a flow of liquid from said intermediate chamber to one of said end chambers, valve means for closing a number of said ports when said piston and member move in a direction with respect to each other and valve means for closing another number of said ports when said piston and member move in an opposite respective direction.

2. A shock absorber comprising supports, a hollow member mounted to move in said supports and having a bored intermediate partition, said supports and member being attachable to parts whose respective motion is to be damped, resilient means positioned between said supports and member, a stem fastened to one of said supports and snugly slidable through said bored partition and extending into said hollow member, a piston on said stem snugly sliding in the hollow of said member, said member and piston providing two end chambers and an intermediate chamber to be filled with liquid, said piston and stem providing a calibrated passage from one to other of said end chambers, and said piston having ports for producing a flow of liquid from said intermediate chamber to one of said end chambers, valve means for closing a number of said ports when said piston and member move in a direction with respect to each other and valve means for closing another number of said ports when said piston and member move in an opposite respective direction.

3. A shock absorber comprising supports, a hollow member mounted to move in said supports and having a bored intermediate partition, said supports and member being attachable to parts whose respective motion is to be damped, a resilient member between said supports and member, an auxiliary resilient member between said supports and member, said auxiliary resilient member being made operative after said first resilient member has been partially compressed, a stem fastened to one of said supports and snugly slidable through said bored partition and extending into said hollow member, a piston on said stem snugly sliding in the hollow of said member, said member and piston providing two end chambers and an intermediate chamber to be filled with liquid, said piston and stem providing a passage from one to other of said end chambers, and said piston having ports for providing a flow of liquid from said intermediate chamber to one of said end chambers, valve means for closing a number of said ports when said piston and member move in a direction with respect to each other, and valve means for closing another number of said ports when said piston and member move in an opposite respective direction.

4. A shock absorber comprising supports, a hollow member mounted to move in said supports and having a bored intermediate partition, said supports and member being attachable to parts whose respective motion is to be damped, resilient means positioned between said support and member to damp their respective motion in one direction, other resilient means positioned between said supports and member to damp their respective motion in opposite direction, a stem fastened to one of said supports and snugly slidable through said bored partition and extending into said hollow member, a piston on said stem snugly sliding in the hollow of said member, said member and piston providing two end chambers and an intermediate chamber to be filled with liquid, said piston and stem providing a passage from one to other of said end chambers, and said piston having ports for producing a flow of liquid from said intermediate chamber to one of said end chambers, valve means for closing a number of said ports when said piston and member move in a direction with respect to each other, and valve means for closing another number of said ports when said piston and member move in an opposite respective direction.

5. A shock absorber comprising supports, a hollow member mounted to move in said supports and having a bored intermediate partition, said supports and member being attachable to parts whose respective motion is to be damped, resilient means positioned between said supports and member to damp their respective motion in one direction, other resilient means between said supports and member to damp the respective motion in opposite direction, the last named resilient means being made operative after the first named ones are inoperative, a stem fastened to one of said supports and snugly slidable through said bored partition and extending into said hollow member, a piston on said stem snugly sliding in the hollow of said member, said member and piston providing two end chambers and an intermediate chamber to be filled with liquid, said piston and stem providing a passage from one to other of said end chambers, and said piston having ports for producing a flow of liquid from said intermediate chamber to one of said end chambers, valve means for closing a number of said ports when said piston and member move in a direction with respect to each other, and valve means for closing another number of said ports when said piston and member move in an opposite respective direction.

6. A shock absorber comprising supports, a hollow member mounted to move in said supports and having a bored intermediate partition, said supports and member being attachable to parts whose respective motion is to be damped, resilient means positioned between said supports and member, a stem fastened to one of said supports and snugly slidable through said bored partition and extending into said hollow member, a piston on said stem snugly sliding in the hollow of said member, said member and piston providing two end chambers and an intermediate chamber to be filled with liquid, said piston and stem providing a passage from one to other of said end chambers, said piston having ports leading from one of said end chambers to said intermediate chamber, flap valves preventing the flow through a number of said ports from said intermediate chamber to said end chamber and a spring valve preventing the flow through another number of said ports from said end chamber to said intermediate chamber.

7. A shock absorber comprising supports, a hollow member mounted to move in said supports and having a bored intermediate partition, said supports and member being attachable to parts whose respective motion is to be damped, resilient means positioned between said supports and member, a stem fastened to one of said supports and snugly slidable through said bored partition and extending into said hollow member, a piston on said stem snugly sliding in the hollow of said member, said member and piston providing two end chambers and an intermediate chamber to be filled with liquid, said piston and stem providing a passage from one to another of said end chambers, said piston having an annular space within it, and ports leading from said space to said intermediate chamber, a spring valve closing said annular space against flow from said end chamber to said intermediate chamber, said piston having further ports leading from said end chamber to said intermediate chamber, and flap valves closing the last named ports against flow from said intermediate chamber to said central chamber.

8. A shock absorber comprising supports, a hollow member mounted to move in said supports and having a bored intermediate partition, said supports and member being attachable to parts whose respective motion is to be damped, resilient means positioned between said supports and member, a stem fastened to one of said supports and snugly slidable through said bored partition and extending into said hollow member, a piston on said stem snugly sliding in the hollow of said member, said member and piston providing two end chambers and an intermediate chamber to be filled with liquid, said piston and stem providing a passage from one to another of said end chambers, said piston having a central space and ports leading therefrom to said intermediate chamber, a sleeve extending in said space to provide an annular orifice and having its hollow in communication with said stem passage, a valve closing said annular orifice, against flow from said end chamber to said intermediate chamber, a tubular extension supporting said valve and sliding on said sleeve, a transverse pin engaged in said sleeve and extending through elongated slots of said tubular extension, a spring acting on said tubular extension and pin to close said valve, said piston having further ports leading from said end chamber to said intermediate chamber, and flap valves closing said ports against flow from said intermediate chamber to said end chamber.

9. A shock absorber comprising supports, a hollow member mounted to move in said supports and having a bored intermediate partition, said supports and member being attachable to parts whose respective motion is to be damped, resilient means positioned between said supports and member, a stem fastened to one of said supports and snugly slidable through said bored partition and extending into said hollow member, a piston on said stem snugly sliding in the hollow of said member, said member and piston providing two end chambers and an intermediate chamber to be filled with liquid, said piston and stem providing a passage from one to other of said end chambers, said piston comprising an enlarged head on the end of said stem and a ring fastened on said head, said head having ports leading from one of said end chambers to said intermediate chamber, a spring valve preventing the flow through said ports from said end chamber into said intermediate chamber, and said ring having ports leading from said end chamber to said intermediate chamber, and flap valves on said ring preventing the flow through the last named ports from said intermediate chamber to said end chamber.

10. A shock absorber comprising supports, a hollow member mounted to move in said supports and having a bored intermediate partition, said supports and member being attachable to parts whose respective motion is to be damped, resilient means positioned between said supports and member, a stem fastened to one of said supports and snugly slidable through said bored partition and extending into said hollow member, a piston on said stem snugly sliding in the hollow of said member, said member and piston providing two end chambers and an intermediate chamber to be filled with liquid, said piston and stem providing a passage from one to other of said end chambers, said piston comprising an enlarged head on the end of said stem and a ring fastened on said head, said head having ports leading from one of said end chambers to said intermediate chamber, a spring valve preventing the flow through said ports from said end chamber into said intermediate chamber, and said ring having ports leading from said end chamber to said intermediate chamber and flap valves on said ring preventing the flow through the last named ports from said intermediate chamber to said end chamber, the said flap valves being held in position by having a portion thereof engaged between said ring and enlarged head.

In testimony whereof I have signed my name to this specification.

VINCENZO LANCIA.